Aug. 1, 1939.  W. J. ALEXANDER  2,167,792
DRAFT CONNECTION BETWEEN VEHICLES
Filed June 10, 1938
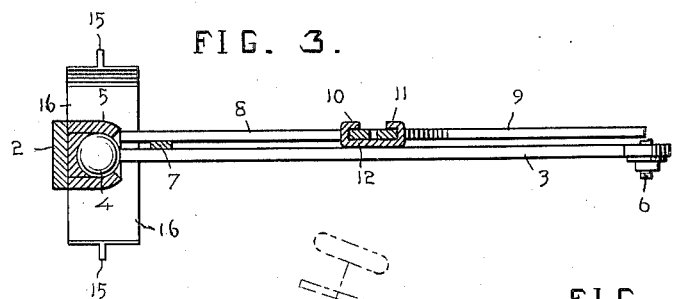
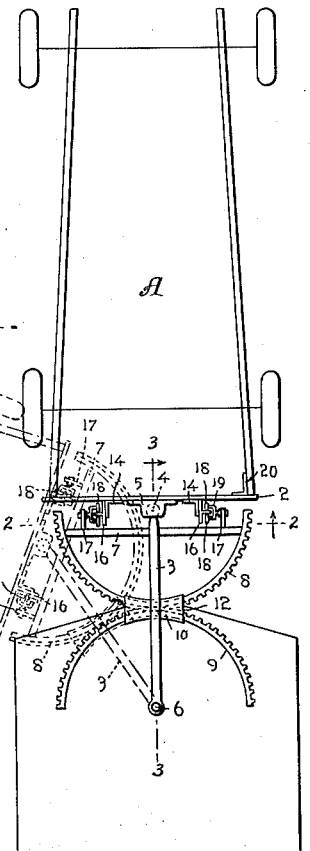
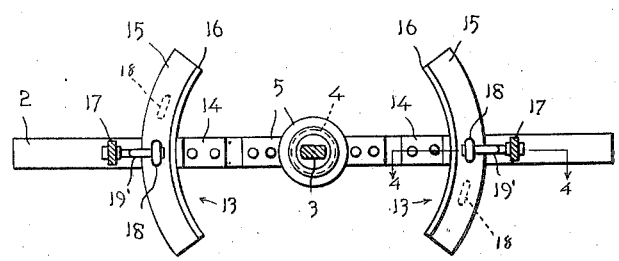
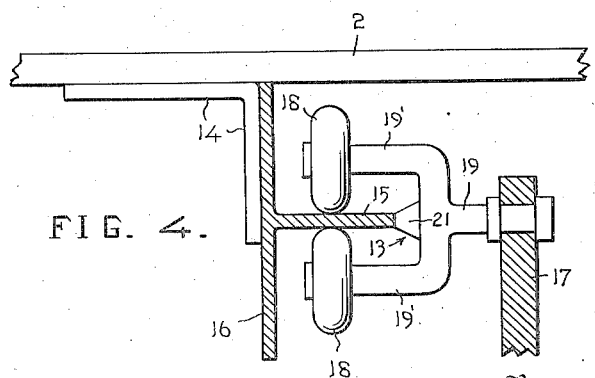
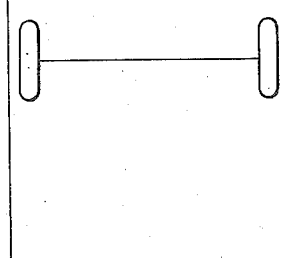
Inventor
William J. Alexander
By Barker & Collings
Attorneys Patented Aug. 1, 1939

2,167,792

UNITED STATES PATENT OFFICE 2,167,792

DRAFT CONNECTION BETWEEN VEHICLES

William J. Alexander, Carthage, Mo.

Application June 10, 1938, Serial No. 213,070

5 Claims. (Cl. 280—33.5)

My invention relates to an improved coupling means employed to unite a motor vehicle serving as a tractor with a trailer vehicle to be drawn thereby. It has for its object to provide a coupling by means of which the two vehicles are united in such manner that they are brought close together and connected so that turns of the connected vehicles can be made with facility and on a short turning radius. As a further object it has to provide a coupling or connection that will permit the vehicles to independently follow the inequalities of the road surface over which they may have to pass without disturbing such connection or coupling in its functional operations. To these ends it consists in incorporating into the coupling intermeshing toothed gearing carried by or pertaining to the two vehicles respectively and means for maintaining such gearing in mesh under all the usual conditions to be met with in the use of connected motor-propelled vehicles.

That my invention may be the better understood I have illustrated in the accompanying drawing a practical embodiment thereof.

Referring to such drawing—

Figure 1 is an inverted plan view, largely diagrammatic in character, illustrative of the invention;

Fig. 2 is a transverse sectional view taken on the line 2—2 of Fig. 1;

Fig. 3 is a longitudinal sectional view taken on the line 3—3 of Fig. 1; and

Fig. 4 is a detailed sectional view, on a larger scale, taken on the line 4—4 of Fig. 2.

Referring to the drawing, A represents a motor vehicle, and B a trailer to be drawn thereby, which is represented as provided with a single axle and two supporting wheels. The details of these two vehicles are quite immaterial to the present invention, and hence no attempt to illustrate them has been made. 2 designates a cross bar or transverse draft member located at the rear of the motor vehicle A. It may be of any suitable construction, and is represented as supported on the vehicle frame by brackets 20. To it is pivotally connected the front end of a tongue or draft bar 3 that unites the two vehicles and serves as the tractor element between them. I prefer that the front pivotal connection of this draft bar should be universal, for which purpose the forward end of such bar is represented as provided with or shaped into a ball-like member 4 that fits into a socket piece 5 carried by the cross bar. The rear end of the draft bar or tongue is connected to the trailer by a pivot 6.

A cross bar 7, of a length approximating the width of the motor vehicle, crosses the draft bar 3 near its front end, such cross bar serving as a support for a large toothed gear or segment 8, the ends of which are suitably connected thereto near its ends. This segment is concentric with the forward pivot of the draft bar, is preferably located above such bar, and its toothed face is toward the rear. 9 represents another gear segment, preferably of the same size as the segment 8 and meshing therewith. Its center is the rear pivot 6 of the draft bar and it is rigidly secured in any suitable manner to the trailer vehicle B. When the two segments are of the same size their radii are each equal to one half the length of the draw bar, measured between the pivotal centers 4 and 6 thereof. They lie directly above and close to the draw bar which moves beneath them as the vehicles are in motion.

In order to keep the two segments in mesh and proper working engagement, that is both in practically the same plane, I provide a support therefor. The form of support illustrated, and which I have found practical, is a channel member 10 supported crosswise upon the draft bar 3 to the central part of which it is rigidly secured. The side walls 11 of this support are curved and overhang respectively the inner rim sections of the segments, as represented in Figure 3, the intermeshing toothed portions of the segments lying within the channel thus formed by the side walls 11 and resting upon the bottom or floor 12 thereof.

It is well understood that the longitudinal undulations of road surfaces over which tandem-connected vehicles have to pass cause the two connected vehicles to move up and down independently and to rock relative one to the other in fore and aft directions. To provide for such movements, which I herein term their rocking movements, the draft connection constituting my invention considered as a unit is pivotally connected with one of the vehicles on a transverse line, so that it may rock relative thereto, thus permitting the rocking movements or articulations between the two vehicles to take place without disturbing the intermeshing relationship of the segments 8 and 9, that is without moving these two parts out of a common plane in which they must lie to work satisfactorily. One method of effecting this transverse pivotal connection of the coupling, is illustrated and will be now described.

17, 17 indicate a pair of arms projecting forwardly from the cross bar 7 to which they are rigidly secured. These arms 17 are located one on either side of the draft tongue 3, preferably about midway between the center line of said tongue and the ends of the bar. Near the free end of each bar there is mounted a short transversely arranged shaft 19 that is free to turn on its longitudinal axis. The two shafts, on opposite sides of the draft bar 3, are in line with each other, and with the center of the ball and socket joint at the forward end of the draft tongue or bar 3. The projecting end of each shaft 19 is bifurcated and formed into a pair of short axles 19' on which are supported rollers or guide wheels 18. These rollers are in engagement with the opposite faces of a vertically disposed curved track 15 that projects outwardly and at right angles from a plate 16 which is supported, by brackets 14, from the rear face of the cross draw bar 2. The guide tracks 15 and their supporting plates 16 are arcuate in shape and concentrically disposed relative to the center of the ball joint uniting the forward end of the tongue to the cross draft bar 2.

It is recognized that not only do the two vehicles articulate relative to each other on a transverse line, having the rocking movements that have been referred to, but they also have what I term rolling movements, that is independent movements of the vehicles transversely, due to inequalities of the road surfaces passed over by the wheels on the opposite sides of the vehicles. It thus becomes necessary that the connection or coupling between the vehicles should not only be free to articulate on a transverse line, that is rocks, but also upon longitudinal lines, that is roll. The universal joint connection of the forward end of the tongue or draft bar 3 permits this latter articulation between the two vehicles about a longitudinal axis without interfering with the working connection of the coupling, as is indicated in Figure 2 of the drawing, where the left hand arm 9 is represented in dotted lines as being raised higher than the right hand arm, the wheels or rollers 15 being correspondingly moved. These shifting movements, about a longitudinal axis of the draft bar does not however disturb the intermeshing and working engagement of the segments which are maintained in a constant plane and in working engagement. The arcuate guide rails or flanges 15 serve to hold the parts steadily in working position when such movements take place, and these movements may occur conjointly with the rocking articulation of the two vehicles; owing to the connection of the front end of the tongue being universal or of a ball and socket nature. In order to better hold the parts in close working relationship and to prevent looseness or rattling, I prefer that the short shafts 19, between the arms that carry the rollers 18, should be formed with bearing projections that engage with the outer edges of the flanges 15, as represented in Figure 4.

By the use of my invention the two coupled vehicles are brought close together and are compelled to act as would a single articulated vehicle in making turns, the gearing connection insuring that the movements of the trailer or following vehicle shall be accurately determined and bear definite relation to the motor vehicle. At the same time, as has been pointed out, the two vehicles are free to articulate with reference to each other as the road conditions may make necessary, this being permitted without interfering with the close gear connection between the two vehicles.

I have illustrated and described but a single embodiment of my invention, but it will be apparent that the invention is not necessarily limited or restricted to such showing, but may be changed, within the limits expressed in the claims. Thus, the pivotal connections permitting the free movements of the connected vehicles are represented as being in the line of connection with the forward or motor vehicle, and that is the preferred arrangement. But, it is apparent that the mechanism could be turned about end for end and the connections permitting rocking and rolling movements of the vehicles be with the trailer vehicle.

What I claim is:

1. A coupling for uniting a motor vehicle and a trailer vehicle, including a draft bar between the two pivotally connected with the trailer vehicle and connected with the motor vehicle by a universal joint, a gear sector supported by the trailer vehicle and another gear sector meshing therewith supported by the draft bar to which it is connected by a cross bar, means for maintaining the segments in mesh and in the same plane, projecting arms extending from the cross bar that supports the forward gear segment, segmental guides concentric with the front universal joint of the draw bar, rollers engaging with the said guides, and supports for the rollers pivotally mounted in the arms that project from the cross bar, such pivots being in line with each other and with the forward universal joint of the draw bar.

2. A coupling for connecting a draft vehicle and a trailer vehicle, comprising a draw-bar; a pivotal connection between said draw-bar and each of said vehicles, one of said connections being arranged to provide for universal movement; intermeshing gear elements, one supported by one of the vehicles and the other by the draw-bar; means for maintaining said gear elements in mesh and in the same plane while the vehicles are coupled together; and a pivotal connection between one of the vehicles and the gear element supported by the draw-bar, disposed in the transverse plane of said universal connection.

3. A coupling mechanism for draft and trailer vehicles comprising a draw-bar; a pivotal connection between said draw-bar and each of said vehicles; intermeshing gear elements, one rigidly supported by one of the vehicles and the other slidably supported by the draw-bar; means for maintaining said gear elements in mesh and in the same plane while the vehicles are coupled together; and a connection between the gear element supported by the draw-bar and its adjacent vehicle, arranged to maintain the longitudinal position of said gear element relative to said vehicle while providing for transverse rolling movements of the vehicle relative to the gear element.

4. A coupling mechanism for draft and trailer vehicles, comprising a draw-bar; a pivotal connection between said draw-bar and each of said vehicles; intermeshing gear elements, one rigidly supported by one of the vehicles and the other slidably supported by the draw-bar; means for maintaining said gear elements in mesh and in the same plane while the vehicles are coupled together; and a connection between the gear element supported by the draw-bar and its adjacent vehicle, including guide members carried by said vehicle and means carried by said gear element engaging with said guide members, arranged to maintain the longitudinal position of the gear element relative to said vehicle while providing for transverse rolling movements of the vehicle relative to the gear element.

5. A coupling mechanism for draft and trailer vehicles, comprising a draw-bar; a pivotal connection between said draw-bar and each of said vehicles; intermeshing gear elements, one rigidly supported by one of said vehicles and the other slidably supported by the draw-bar; means for maintaining said gear elements in mesh and in the same plane while the vehicles are coupled together; and a connection between the gear element supported by the draw-bar and its adjacent vehicle, including curved vertically extending guide members carried by said vehicle and rollers carried by said gear element and engaging with said guide elements, arranged to maintain the longitudinal position of the gear element relative to said vehicle while providing for transverse rolling movements of the vehicle relative to the gear element.

WILLIAM J. ALEXANDER.